(12) United States Patent
Feng et al.

(10) Patent No.: US 12,401,026 B2
(45) Date of Patent: Aug. 26, 2025

(54) METHOD FOR PREPARING SILICON-CARBON COMPOSITE ANODE MATERIAL AND USE THEREOF

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Maohua Feng, Guangdong (CN); Changdong Li, Guangdong (CN); Xingyu Wu, Guangdong (CN); Dingshan Ruan, Guangdong (CN); Baoye Liu, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/686,455

(22) PCT Filed: Feb. 20, 2023

(86) PCT No.: PCT/CN2023/077215
§ 371 (c)(1),
(2) Date: Feb. 26, 2024

(87) PCT Pub. No.: WO2023/213113
PCT Pub. Date: Nov. 9, 2023

(65) Prior Publication Data
US 2024/0372083 A1    Nov. 7, 2024

(30) Foreign Application Priority Data

May 5, 2022    (CN) .......................... 202210479728.1

(51) Int. Cl.
*H01M 4/38*    (2006.01)
*H01M 4/587*    (2010.01)
(Continued)

(52) U.S. Cl.
CPC ........... *H01M 4/386* (2013.01); *H01M 4/587* (2013.01); *H01M 10/0525* (2013.01); *H01M 2004/027* (2013.01)

(58) Field of Classification Search
CPC ... H01M 2004/027; Y02E 60/10; C01B 32/90
See application file for complete search history.

(56) References Cited

U.S. PATENT DOCUMENTS

2014/0308585 A1    10/2014 Han et al.

FOREIGN PATENT DOCUMENTS

| CN | 1402366 A | 3/2003 |
|----|-----------|--------|
| CN | 109216686 A | 1/2019 |

OTHER PUBLICATIONS

International Search Report of PCT Patent Application No. PCT/CN2023/077215 issued on May 17, 2023.

*Primary Examiner* — Khanh T Nguyen
(74) *Attorney, Agent, or Firm* — Falcon Rappaport & Berkman LLP

(57) ABSTRACT

The present disclosure discloses a preparation method for a silicon/carbon composite anode material and use of thereof. The preparation method includes the following steps: heating a hypercrosslinked polymer in an inert atmosphere for carbonization to obtain a porous carbide; mixing the porous carbide with a silicon-containing solution to obtain a silicon-containing porous carbide suspension; and adding a complexing agent, a metal salt, and a reducing agent to the (Continued)

silicon-containing porous carbide suspension to allow a reaction, and after the reaction is completed, conducting solid-liquid separation to obtain a solid, and heating the solid in an inert atmosphere to obtain the silicon/carbon composite anode material. In the present disclosure, the metal salt is reduced with the reducing agent under an action of the complexing agent through a metal-embedded-into-silicon treatment, such that a metal layer is formed on a silicon layer adsorbed on the porous carbide.

18 Claims, 1 Drawing Sheet

(51) Int. Cl.
*H01M 10/0525* (2010.01)
*H01M 4/02* (2006.01)

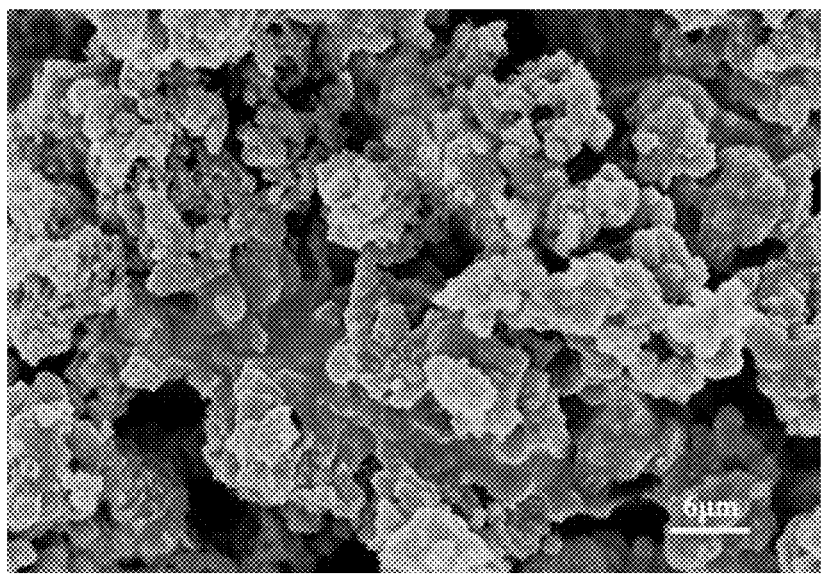

METHOD FOR PREPARING SILICON-CARBON COMPOSITE ANODE MATERIAL AND USE THEREOF

TECHNICAL FIELD

The present disclosure belongs to the technical field of lithium-ion batteries, and particularly relates to a preparation method for a silicon/carbon composite anode material and a use thereof.

BACKGROUND

Silicon-based anode materials have promising commercial application prospects due to their abundant sources, low cost, high theoretical lithium storage capacity, and suitable dilithiation voltage. However, in contrast to graphite, silicon is shrunk and expanded repeatedly during a lithium deintercalation/intercalation process, such that an electrical contact of a negative electrode sheet easily loses and thus a material on the negative electrode sheet is deactivated, which may greatly reduce the application prospects of silicon-based anode materials. In addition, because the silicon-based anode materials have larger specific surface area and produce a large number of defective side reactions, the practical application of silicon-based anode materials also has problems such as low first-cycle coulombic efficiency, insufficient long-cycling stability, and poor rate performance.

Currently, a silicon-based anode material is combined with a carbon material and a morphological design between the two is regulated to synthesize a structure with high stability, such that a silicon/carbon anode material obtained therefrom can improve the diffusion of lithium ions and increase a transmission rate of electrons so as to improve the cycling stability, which is an effective means to solve the defects of silicon anode materials.

For example, in addition to properties of an ordinary carbon material, a porous carbon material has advantages such as high specific surface area, high contact area, controllable porous structure, and easy modification because the introduction of abundant pore structures provides a space for silicon to expand. Therefore, how to optimize a structure of a porous carbon material and combine the porous carbon material with a silicon-based anode material to improve the performance of a silicon/carbon anode material is still a problem.

SUMMARY

The present disclosure is intended to solve at least one of the technical problems existing in the prior art. In view of this, the present disclosure provides a preparation method for a silicon/carbon composite anode material and a use thereof.

According to an aspect of the present disclosure, a preparation method for a silicon/carbon composite anode material is provided, including the following steps:

S1: heating a hypercrosslinked polymer in an inert atmosphere for carbonization to obtain a porous carbide;
S2: mixing the porous carbide with a silicon-containing solution to obtain a silicon-containing porous carbide suspension; and
S3: adding a complexing agent, a metal salt, and a reducing agent to the silicon-containing porous carbide suspension to allow a reaction, and after the reaction is completed, conducting solid-liquid separation to obtain a solid, and heating the solid in an inert atmosphere to obtain the silicon/carbon composite anode material.

In some embodiments of the present disclosure, the step S1 further comprises preparation of the hypercrosslinked polymer which comprises: in an inert atmosphere, mixing a benzenediol compound, a solvent, and a crosslinking agent, after cooling, adding a catalyst and mixing, and heating a resulting mixture to allow a reaction to obtain the hypercrosslinked polymer. Preferably, the benzenediol compound is at least one selected from the group consisting of p-benzenedimethanol, m-benzenedimethanol, o-benzenedimethanol, p-benzenediethanol, m-benzenediethanol, or o-benzenediethanol. The solvent is at least one selected from the group consisting of tetrachloromethane, trichloromethane, chloroethane, dichloroethane, trichloroethane, chloropropane, dichloropropane, trichloropropane, or tetrachloropropane. The crosslinking agent is dimethoxymethane. The catalyst is iron chloride.

In some embodiments of the present disclosure, in step S1, a ratio of the benzenediol compound to the solvent to the catalyst to the crosslinking agent is (5-10) g:(15-80) mL:(1.2-6) g:(1-5) mL.

In some embodiments of the present disclosure, in step S1, the cooling is conducted at a temperature from 0° C. to 12° C.

In some embodiments of the present disclosure, in step S1, the benzenediol compound, the solvent, and the crosslinking agent are mixed for 2 h to 4 h, and after the catalyst is added, a resulting mixture is mixed for 6 h to 12 h.

In some embodiments of the present disclosure, in step S1, the resulting mixture is heated to allow a reaction at a temperature from 60° C. to 120° C. for 1 h to 3 h.

In some embodiments of the present disclosure, in step S1, the heating for carbonization is conducted as follows: heating at a temperature from 100° C. to 320° C. for 0.1 h to 3 h, and then heating at a temperature from 600° C. to 1,000° C. for 8 h to 24 h, during the heating for carbonization, an inert gas is introduced to allow pore-expansion treatment under an action of gas flow. Further, a flow rate of the inert gas is in a range from 0.005 m³/min to 0.08 m³/min.

In some embodiments of the present disclosure, in step S1, the porous carbide has a particle size D50 of 2 μm to 26 μm and a specific surface area of 200 m²/g to 350 m²/g.

In some embodiments of the present disclosure, in step S2, the silicon-containing solution is a nano-silicon oxide suspension or a nano-silicon suspension, and a mass percentage of silicon in the silicon-containing solution is in a range from 0.001 to 0.75. The nano-silicon oxide has a chemical formula of $SiO_x$, where $0<x\le 2$.

In some embodiments of the present disclosure, in step S3, the complexing agent is at least one selected from the group consisting of potassium sodium tartrate, ethylene diamine tetraacetic acid, and tartaric acid.

In some embodiments of the present disclosure, in step S3, the metal salt is at least one selected from the group consisting of a soluble sulfate, a soluble chloride, a soluble nitrate, a soluble bromide, and a soluble phosphate of copper or silver; and the reducing agent is at least one selected from the group consisting of hypophosphorous acid and sodium hypophosphite.

In some embodiments of the present disclosure, in step S3, the heating is conducted at a temperature from 550° C. to 1,100° C. for 1 h to 5 h.

In some embodiments of the present disclosure, in step S3, the silicon/carbon composite anode material has a particle size D50 of 0.5 μm to 23 μm.

In some embodiments of the present disclosure, in step S3, a mass percentage of silicon in the silicon/carbon composite anode material is in a range from 0.001 to 0.35.

In some embodiments of the present disclosure, in step S3, a mass percentage of metal in the silicon/carbon composite anode material is in a range from 0.001 to 0.02.

In some embodiments of the present disclosure, in step S3, a mass ratio of the complexing agent to the metal salt to the reducing agent in the silicon-containing porous carbide suspension is (1-10): (0.2-5): (10-50), where a mass ratio of the metal salt to the silicon in the silicon-containing porous carbide suspension is (0.1-2): 3.

In some embodiments of the present disclosure, the inert atmosphere is at least one atmosphere selected from the group consisting of neon, helium, argon, krypton, xenon, and nitrogen.

The present disclosure also provides use of the preparation method described above in the preparation of a lithium-ion battery.

According to a preferred embodiment of the present disclosure, the present disclosure at least has the following beneficial effects:

1. In the porous carbide obtained by subjecting an hypercrosslinked polymer to high-temperature carbonization treatment, a carbon layer can provide a number of channels for the transmission of electrons and $Li^+$, provide a large internal excess space, and provide a large buffer space for volume expansion of silicon, such that a volume effect of a silicon-based anode material during a lithium deintercalation/intercalation process is reduced to some extent, thereby improving the cycling performance of the anode material.

2. Silicon, as a semiconductor material, has poor electrical conductivity, and an expansion effect of silicon during a cyclic charge and discharge process also further deteriorates the structure of the anode material. Therefore, a metal salt is reduced with the reducing agent under an action of a complexing agent through metal-embedded-into-silicon treatment, such that a metal layer with excellent ductility and electrical conductivity is formed on a silicon layer adsorbed on the porous carbide; and then the metal layer is alloyed with silicon at an elevated temperature, such that the alloyed silicon is closely bonded. The prepared silicon/carbon composite anode material possesses improved extensibility, bendability and compressibility. The metal layer can effectively bear a stress due to a volume change caused by silicon expansion, and improve the electrical conductivity of the material.

BRIEF DESCRIPTION OF THE DRAWINGS

The present disclosure is further described below with reference to accompanying drawings and examples, in which, The sole FIGURE is a scanning electron microscopy (SEM) image of the silicon/carbon composite anode material according to Example 1 of the present disclosure.

DETAILED DESCRIPTION

The concepts and technical effects of the present disclosure are clearly and completely described below in conjunction with examples, such as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present disclosure.

Example 1

In this example, a silicon/carbon composite anode material was prepared, and a specific preparation process was as follows:

1. p-Benzenedimethanol (100 g), tetrachloromethane, ferric chloride, and dimethoxymethane were weighed out according to a ratio of 5 g:15 mL:2 g:1.2 mL; and the p-benzenedimethanol, tetrachloromethane, and dimethoxymethane were mixed and stirred for 2 h in a vessel with a nitrogen atmosphere and then cooled for 0.5 h in an ice water bath at 2° C., then the weighed ferric chloride was added, and a resulting mixture was further stirred for 6 h to obtain a homogeneous mixture.

2. The homogeneous mixture was heated for a reaction at 75° C. for 3 h to obtain an hypercrosslinked polymer, and the hypercrosslinked polymer was washed repeatedly with a mixed solution of ethanol and water to remove excess tetrachloromethane and ferric chloride; the vessel containing the hypercrosslinked polymer was transferred to a heating device, and the hypercrosslinked polymer was subjected to first-stage heating at 110° C. for 3 h and then to second-stage heating at 865° C. for 15 h, nitrogen was introduced during heating such that a pore-expansion treatment was allowed under an action of gas flow (0.01 $m^3$/min) to obtain a porous carbide; and the porous carbide was subjected to ball-milling in a ball mill to obtain a porous carbide material with a particle size D50 of about 6.3 μm.

3. 80 g of the porous carbide material obtained after the ball-milling in step 2 was mixed with 100 mL of a nano-silica suspension for 5 h (a particle size of nano-silica being about 40 nm, and a mass percentage of silicon in the nano-silica suspension being 0.13) to obtain a silicon-containing porous carbide suspension; and a half of the silicon-containing porous carbide suspension was not further treated, i.e., it was not subjected to metal-embedded treatment, rather allowed to stand for 3 h, and subjected to solid-liquid separation to obtain a solid, and the solid was heated at 845° C. for 3 h in an argon atmosphere to obtain a silicon-containing porous carbide with a mass percentage of silicon of 0.07.

4. The other half of the silicon-containing porous carbide suspension, ethylene diamine tetraacetic acid, copper sulfate, and hypophosphorous acid were mixed (a mass ratio of ethylene diamine tetraacetic acid to copper sulfate to hypophosphorous acid added into the other half of the silicon-containing porous carbide suspension being 1.2:1.7: 12, and a mass ratio of the copper sulfate to silicon in the silicon-containing porous carbide suspension being 0.2:3), and a resulting mixture was stirred at 75° C. to allow a reaction; after the reaction was completed, a reaction system was allowed to stand for 3 h and subjected to solid-liquid separation, and a resulting solid was washed to remove impurities and then heated at 845° C. for 3 h in an argon atmosphere to obtain a porous carbide with a silicon-copper alloy; and the porous carbide with the silicon-copper alloy was subjected to ball-milling (D50 controlled at about 6.5 μm) and demagnetization to obtain the silicon/carbon composite anode material, with mass percentages of silicon and copper of 0.07 and 0.004, respectively. The sole FIGURE is a SEM image of the obtained silicon/carbon composite anode material according to Example 1.

Example 2

In this example, a silicon/carbon composite anode material was prepared, and a specific preparation process was as follows:

1. p-Benzenedimethanol (100 g), tetrachloromethane, ferric chloride, and dimethoxymethane were weighed out according to a ratio of 6 g:20 mL:2.7 g:1.5 mL; and the p-benzenedimethanol, tetrachloromethane, and dimethoxymethane were mixed and stirred for 2 h in a vessel with a nitrogen atmosphere and then cooled for 0.5 h in an ice water bath at 2° C., then the weighed ferric chloride was added, and a resulting mixture was further stirred for 6 h to obtain a homogeneous mixture.

2. The homogeneous mixture was heated for a reaction at 75° C. for 3 h to obtain an hypercrosslinked polymer, and the hypercrosslinked polymer was washed repeatedly with a mixed solution of ethanol and water to remove excess tetrachloromethane and ferric chloride; the vessel containing the hypercrosslinked polymer was transferred to a heating device, and the hypercrosslinked polymer was subjected to first-stage heating at 110° C. for 2 h and then to second-stage heating at 865° C. for 15 h, nitrogen was introduced during heating such that a pore-expansion treatment was allowed under an action of gas flow (0.01 m$^3$/min) to obtain a porous carbide; and the porous carbide was subjected to ball-milling in a ball mill to obtain a porous carbide material with a particle size D50 of about 5.3 μm.

3. 80 g of the porous carbide material obtained after the ball-milling in step 2 was mixed with 100 mL of a nano-silica suspension for 5 h (a particle size of nano-silica being about 40 nm, and a mass percentage of silicon in the nano-silica suspension being 0.13) to obtain a silicon-containing porous carbide suspension; and a half of the silicon-containing porous carbide suspension was not further treated, i.e., it was not subjected to metal-embedded treatment, rather allowed to stand for 3 h, and subjected to solid-liquid separation to obtain a solid, and the solid was heated at 870° C. for 3 h in an argon atmosphere to obtain a silicon-containing porous carbide, with a mass percentage of silicon of 0.11.

4. The other half of the silicon-containing porous carbide suspension, ethylene diamine tetraacetic acid, copper sulfate, and hypophosphorous acid were mixed (a mass ratio of ethylene diamine tetraacetic acid to copper sulfate to hypophosphorous acid added into the other half of the silicon-containing porous carbide suspension being 1.6:2.3:22, and a mass ratio of the copper sulfate to silicon in the silicon-containing porous carbide suspension being 0.27:3), and a resulting mixture was stirred at 75° C. to allow a reaction; after the reaction was completed, a reaction system was allowed to stand for 3 h and subjected to solid-liquid separation, and a resulting solid was washed to remove impurities and then heated at 870° C. for 3 h in an argon atmosphere to obtain a porous carbide with a silicon-copper alloy; and the porous carbide with the silicon-copper alloy was subjected to ball-milling (D50 controlled at about 5.9 μm) and demagnetization to obtain the silicon/carbon composite anode material, with mass percentages of silicon and copper of 0.11 and 0.007, respectively.

Example 3

In this example, a silicon/carbon composite anode material was prepared, and a specific preparation process was as follows:

1. p-Benzenedimethanol (100 g), tetrachloromethane, ferric chloride, and dimethoxymethane were weighed out according to a ratio of 6 g:20 mL:2.7 g:1.5 mL; and the p-benzenedimethanol, tetrachloromethane, and dimethoxymethane were mixed and stirred for 2 h in a vessel with a nitrogen atmosphere and then cooled for 0.5 h in an ice water bath at 2° C., then the weighed ferric chloride was added, and a resulting mixture was further stirred for 6 h to obtain a homogeneous mixture.

2. The homogeneous mixture was heated for a reaction at 75° C. for 3 h to obtain an hypercrosslinked polymer, and the hypercrosslinked polymer was washed repeatedly with a mixed solution of ethanol and water to remove excess tetrachloromethane and ferric chloride; the vessel containing the hypercrosslinked polymer was transferred to a heating device, and the hypercrosslinked polymer was subjected to first-stage heating at 110° C. for 2 h and then to second-stage heating at 865° C. for 15 h, neon was introduced during heating such that a pore-expansion treatment was allowed under an action of gas flow (0.015 m$^3$/min) to obtain a porous carbide; and the porous carbide was subjected to ball-milling in a ball mill to obtain a porous carbide material with a particle size D50 of about 5.6 μm.

3. 80 g of the porous carbide material obtained after the ball-milling in step 2 was mixed with 100 mL of a nano-silica suspension for 5 h (a particle size of nano-silica being about 40 nm, and a mass percentage of silicon in the nano-silica suspension being 0.23) to obtain a silicon-containing porous carbide suspension; and a half of the silicon-containing porous carbide suspension was not further treated, i.e., it was not subjected to metal-embedded treatment, rather allowed to stand for 3 h, and subjected to solid-liquid separation to obtain a solid, and the solid was heated at 960° C. for 2.5 h in an argon atmosphere to obtain a silicon-containing porous carbide with a mass percentage of silicon of 0.14.

4. The other half of the silicon-containing porous carbide suspension, ethylene diamine tetraacetic acid, copper sulfate, and hypophosphorous acid were mixed (a mass ratio of ethylene diamine tetraacetic acid to copper sulfate to hypophosphorous acid added into the other half of the silicon-containing porous carbide suspension being 3:3.5:28, and a mass ratio of the copper sulfate to silicon in the silicon-containing porous carbide suspension being 0.3:3), and a resulting mixture was stirred at 75° C. to allow a reaction; after the reaction was completed, a reaction system was allowed to stand for 3 h and subjected to solid-liquid separation, and a resulting solid was washed to remove impurities and then heated at 960° C. for 2.5 h in an argon atmosphere to obtain a porous carbide with a silicon-copper alloy; and the porous carbide with the silicon-copper alloy was subjected to ball-milling (D50 controlled at about 5.1 μm) and demagnetization to obtain the silicon/carbon composite anode material, with mass percentages of silicon and copper of 0.14 and 0.006, respectively.

Example 4

In this example, a silicon/carbon composite anode material was prepared, and a specific preparation process was as follows:

1. o-Benzenedimethanol (100 g), tetrachloromethane, ferric chloride, and dimethoxymethane were weighed out according to a ratio of 6 g:40 mL:4.2 g:2.0 mL; and the o-benzenedimethanol, tetrachloromethane, and dimethoxymethane were mixed and stirred for 2 h in a vessel with a nitrogen atmosphere and then cooled for 0.5 h in an ice water bath at 6° C., then the weighed ferric chloride was added, and a resulting mixture was further stirred for 6 h to obtain a homogeneous mixture.

2. The homogeneous mixture was heated for a reaction at 75° C. for 3 h to obtain an hypercrosslinked polymer, and the hypercrosslinked polymer was washed repeatedly with a mixed solution of ethanol and water to remove excess tetrachloromethane and ferric chloride; the vessel filled with the hypercrosslinked polymer was transferred to a heating device, and the hypercrosslinked polymer was subjected to first-stage heating at 110° C. for 2 h and then to second-stage heating at 735° C. for 15 h, neon was introduced during heating such that a pore-expansion treatment was allowed under an action of gas flow (0.015 $m^3$/min) to obtain a porous carbide; and the porous carbide was subjected to ball-milling in a ball mill to obtain a porous carbide material with a particle size D50 of about 3.4 μm.

3. 80 g of the porous carbide material obtained after the ball-milling in step 2 was mixed with 100 mL of a nano-silica suspension for 5 h (a particle size of nano-silica being about 40 nm, and a mass percentage of silicon in the nano-silica suspension being 0.24) to obtain a silicon-containing porous carbide suspension; and a half of the silicon-containing porous carbide suspension was not further treated, i.e., it was not subjected to metal-embedded treatment, rather allowed to stand for 3 h, and subjected to solid-liquid separation to obtain a solid, and the solid was heated at 960° C. for 2.5 h in an argon atmosphere to obtain a silicon-containing porous carbide with a mass percentage of silicon of 0.15.

4. The other half of the silicon-containing porous carbide suspension, potassium sodium tartrate, silver chloride, and hypophosphorous acid were mixed (a mass ratio of potassium sodium tartrate to silver chloride to hypophosphorous acid added into the other half of the silicon-containing porous carbide suspension being 8:3.2:36, and a mass ratio of the silver chloride to silicon in the silicon-containing porous carbide suspension being 0.3:3), and a resulting mixture was stirred at 60° C. to allow a reaction; after the reaction was completed, a reaction system was allowed to stand for 3 h and subjected to solid-liquid separation, and a resulting solid was washed to remove impurities and then heated at 960° C. for 2.5 h in an argon atmosphere to obtain a porous carbide with a silicon-silver alloy; and the porous carbide with a silicon-silver alloy was subjected to ball-milling (D50 controlled at about 3.5 μm) and demagnetization to obtain the silicon/carbon composite anode material, with mass percentages of silicon and silver of 0.15 and 0.003, respectively.

Test Example

1. The electrical conductivity was tested by the four-point-probe method for the silicon-containing porous carbides and silicon/carbon composite anode materials obtained in Examples 1 to 4, and results were shown in Table 1.

2. An anode sheet expansion ratio was calculated according to the following formula: anode sheet expansion ratio=(thickness of an anode sheet fully charged-thickness of the anode sheet being dried)/thickness of the anode sheet being dried*100%, and calculation results were shown in Table 1.

TABLE 1

Specific surface area, electrical conductivity, and anode sheet expansion ratio of the anode materials

| | Specific surface area ($m^2$/g) Porous carbide | Electrical conductivity ($S \cdot cm^{-1}$) | | Anode sheet expansion ratio (%) | |
| --- | --- | --- | --- | --- | --- |
| | | Silicon-containing porous carbide | Silicon/carbon composite anode material | Silicon-containing porous carbide | Silicon/carbon composite anode material |
| Example 1 | 272.86 | 0.0033 | 0.0096 | 27.1 | 23.3 |
| Example 2 | 278.65 | 0.0028 | 0.0103 | 29.4 | 24.7 |
| Example 3 | 285.19 | 0.0023 | 0.0109 | 31.2 | 25.3 |
| Example 4 | 300.21 | 0.0012 | 0.0103 | 36.4 | 26.5 |

It can be seen from the test results in Table 1 that the porous carbides obtained in step 2 have higher specific surface area, and the silicon/carbon composite anode materials have significantly improved electrical conductivity compared with the materials in which silicon and carbon are not composed. In addition, the silicon/carbon composite anode materials have better expansion ratios during a charge and discharge process than the materials in which silicon and carbon are not composed.

3. Electrochemical performance test: An anode sheet of a battery was manufactured by scraping. Each of the silicon-containing porous carbides and silicon/carbon composite anode materials prepared in Examples 1 to 4, a conductive agent SuperP, and polyvinylidene fluoride (PVDF) were weighed out according to a mass ratio of 8:1:1 and mixed thoroughly in N-methylpyrrolidone (NMP) as a solvent, and a resulting mixture was coated on a copper foil with a scraper, then pressed, and dried in a vacuum oven at 80° C. for 3 h; and a coated sheet was punched and cut to a disc with a diameter of 12 mm. In a half cell, a dry electrode sheet was used at an anode side, a lithium sheet was used as a counter electrode at a cathode side, Celgard 2400 was used as a separator, and 1 M $LiPF_6$ in a mixture of EC, DMC, and DEC (in a volume ratio of 1:1:1) was used as an electrolyte. A CT2001A battery detection system was used to test the prepared half-cell for charge-discharge performance at a voltage in a range from 0.01 V to 2.0 V and a current density of 100 mA/g, and test results were shown in Table 2.

TABLE 2

Electrochemical performance of anode materials

| | Initial charge specific capacity (mAh/g) | | Initial coulombic efficiency (%) | | Capacity retention after 200 cycles (%) | |
| --- | --- | --- | --- | --- | --- | --- |
| | Silicon-containing porous carbide | Silicon/carbon composite anode material | Silicon-containing porous carbide | Silicon/carbon composite anode material | Silicon-containing porous carbide | Silicon/carbon composite anode material |
| Example 1 | 508.7 | 523.5 | 76.3 | 86.3 | 71.6 | 83.1 |
| Example 2 | 701.8 | 722.8 | 75.8 | 86.8 | 71.1 | 83.6 |
| Example 3 | 795.1 | 812.6 | 75.4 | 87.4 | 70.7 | 84.2 |
| Example 4 | 802.3 | 835.9 | 73.9 | 87.5 | 69.3 | 84.3 |

It can be seen from the test results in Table 2 that the silicon/carbon composite anode materials are superior to the silicon-containing porous carbides in which silicon and carbon are not composed in terms of the initial charge specific capacity, the coulombic efficiency, and the capacity retention rate after 200 cycles, indicating that the composite metal layer can effectively bear a stress due to a volume change caused by silicon expansion and further reduce a volume effect of a silicon-based anode material during a lithium deintercalation/intercalation process.

The examples of the present disclosure are described in detail with reference to the accompanying drawings, but the present disclosure is not limited to the above examples. Within the scope of knowledge possessed by those of ordinary skill in the technical field, various changes can also be made without departing from the purpose of the present disclosure. In addition, the examples and features in the examples of the present disclosure may be combined with each other in a non-conflicting situation.

The invention claimed is:

1. A preparation method for a silicon/carbon composite anode material, comprising the following steps:
   S1: heating a hypercrosslinked polymer in an inert atmosphere for carbonization to obtain a porous carbide;
   S2: mixing the porous carbide with a silicon-containing solution to obtain a silicon-containing porous carbide suspension; and
   S3: adding a complexing agent, a metal salt, and a reducing agent to the silicon-containing porous carbide suspension to allow a reaction, and after the reaction is completed, conducting solid-liquid separation to obtain a solid, and heating the solid in an inert atmosphere to obtain the silicon/carbon composite anode material.

2. The preparation method according to claim 1, wherein the step S1 further comprises preparation of the hypercrosslinked polymer which comprises: in an inert atmosphere, mixing a benzenediol compound, a solvent, and a crosslinking agent, after cooling, adding a catalyst and mixing, and heating a resulting mixture to allow a reaction to obtain the hypercrosslinked polymer.

3. Use of the preparation method according to claim 2 in preparation of a lithium-ion battery.

4. The preparation method according to claim 1, wherein in step S1, the heating for carbonization is conducted as follows: heating at a temperature from 100° C. to 320° C. for 0.1 h to 3 h, and then heating at a temperature from 600° C. to 1,000° C. for 8 h to 24 h, during the heating for carbonization, an inert gas is introduced to allow pore-expansion treatment under an action of gas flow.

5. Use of the preparation method according to claim 4 in preparation of a lithium-ion battery.

6. The preparation method according to claim 1, wherein in step S1, the porous carbide has a particle size D50 of 2 μm to 26 μm and a specific surface area of 200 $m^2$/g to 350 $m^2$/g.

7. Use of the preparation method according to claim 6 in preparation of a lithium-ion battery.

8. The preparation method according to claim 1, wherein in step S2, the silicon-containing solution is a nano-silicon oxide suspension or a nano-silicon suspension, and a mass percentage of silicon in the silicon-containing solution is in a range from 0.001 to 0.75.

9. Use of the preparation method according to claim 8 in preparation of a lithium-ion battery.

10. The preparation method according to claim 1, wherein in step S3, the complexing agent is at least one selected from the group consisting of potassium sodium tartrate, ethylene diamine tetraacetic acid, and tartaric acid.

11. Use of the preparation method according to claim 10 in preparation of a lithium-ion battery.

12. The preparation method according to claim 1, wherein in step S3, the metal salt is at least one selected from the group consisting of a soluble sulfate, a soluble chloride, a soluble nitrate, a soluble bromide, and a soluble phosphate of copper or silver; and the reducing agent is at least one selected from the group consisting of hypophosphorous acid and sodium hypophosphite.

13. Use of the preparation method according to claim 12 in preparation of a lithium-ion battery.

14. The preparation method according to claim 1, wherein in step S3, the heating is conducted at a temperature from 550° C. to 1,100° C. for 1 h to 5 h.

15. Use of the preparation method according to claim 14 in preparation of a lithium-ion battery.

16. The preparation method according to claim 1, wherein in step S3, the silicon/carbon composite anode material has a particle size D50 of 0.5 μm to 23 μm.

17. Use of the preparation method according to claim 16 in preparation of a lithium-ion battery.

18. Use of the preparation method according to claim 1 in preparation of a lithium-ion battery.

* * * * *